United States Patent
Turbak et al.

[15] 3,676,382

[45] July 11, 1972

[54] ADHESIVE FOR REGENERATED CELLULOSE

[72] Inventors: Albin F. Turbak; Henry J. Rose, both of Danville, Ill.

[73] Assignee: Tee-Pak, Inc., Chicago, Ill.

[22] Filed: May 19, 1970

[21] Appl. No.: 38,911

Related U.S. Application Data

[63] Continuation-in-part of Ser. Nos. 779,230, Nov. 26, 1968, abandoned, and Ser. No. 731,519, May 23, 1968, Pat. No. 3,630,826, and Ser. No. 718,343, April 3, 1968.

[52] U.S. Cl. ........................ 260/18 TN, 106/171, 117/145, 161/190, 260/18 PT, 260/31.2 N, 260/32.8 N, 260/33.2 R, 260/33.6 UB, 260/77.5 AT

[51] Int. Cl. .................................................. C08g 22/04

[58] Field of Search .............. 260/18, 18 TN, 18 PF, 18 PT, 260/30.4, 31.2, 29.1, 77.5 AT, 858, 2.5 AF, 2.5 AG, 31.2 N, 33.2 R, 32.8 N, 33.6 UB; 106/171; 161/190; 117/145

[56] References Cited

UNITED STATES PATENTS

| | | | |
|---|---|---|---|
| 2,894,919 | 7/1959 | Simon | 260/2.5 |
| 2,929,800 | 3/1960 | Hill | 260/77.5 |
| 2,953,533 | 9/1960 | Khawam | 260/2.5 |
| 2,983,693 | 5/1961 | Sievers | 260/18 |
| 3,305,497 | 2/1967 | Stallings et al. | 260/2.5 |
| 3,558,531 | 1/1971 | Salyer et al. | 260/2.5 |
| 3,005,728 | 10/1961 | Bridgeford | 117/145 |
| 3,027,343 | 5/1962 | Kane | 117/145 |
| 3,149,040 | 9/1964 | Jeffries | 106/171 |
| 3,192,287 | 6/1965 | Pelzek | 117/145 |
| 3,316,189 | 4/1967 | Adams | 117/145 |
| 3,345,388 | 10/1967 | Milligan et al. | 260/18 |
| 3,428,468 | 2/1969 | Blake | 106/171 |
| 3,473,933 | 10/1969 | Sato et al. | 260/23 |
| 3,490,987 | 1/1970 | Bauriedel | 161/190 |
| 3,510,439 | 5/1970 | Kaltenbach et al. | 161/190 |

*Primary Examiner*—James A. Seidleck
*Assistant Examiner*—Eugene C. Rzucidlo
*Attorney*—Neal J. Mosely and David V. Munnis

[57] ABSTRACT

A novel adhesive for sealing or joining sheets or films of regenerated cellulose or fiber-reinforced regenerated cellulose comprises a fluid, organic solvent solution having a solute comprising a film-forming polymeric polyisocyanate, and a curing agent for the polyisocyanate including a plasticizer ingredient, such as a polyol or a reaction product of a polyol with ethylene oxide or the like, and a surfactant ingredient, such as a fatty acid partial ester of sorbitan. The coating composition may be used to seam sheets of regenerated cellulose or paper-reinforced regenerated cellulose into tubular form or in forming cemented end closures on tubes of regenerated cellulose or paper-reinforced regenerated cellulose. The adhesive composition is preferably applied in a very thin film, allowed to penetrate into the regenerated cellulose substrate, and cured by heating at an elevated temperature, e.g. 300°–320π ζ f., for about 20–30 sec., more or less.

5 Claims, No Drawings

3,676,382

ADHESIVE FOR REGENERATED CELLULOSE

CROSS-REFERENCE TO RELATED APPLICATIONS

This application is a continuation-in-part of co-pending application Ser. No. 779,230, filed Nov. 26, 1968 now abandoned; application Ser. No. 731,519, filed May 23, 1968, now U.S. Pat. No. 3,630,826 and application, Ser. No. 718,343, filed Apr. 3, 1968.

BACKGROUND OF THE INVENTION

This invention relates to novel adhesive compositions for joining films of regenerated cellulose or paper-reinforced regenerated cellulose and is particularly useful in forming adhesive seals which have high dry and wet strength.

In the formation of regenerated cellulose or paper-reinforced regenerated cellulose sausage casings by adhesive seaming of flat stock, it is necessary to provide an adhesive which will form a seal having high wet and dry strength. In fact, the wet strength of such an adhesive seal must be sufficient to prevent breakage along the seal when the casing is stuffed and immersed in hot water.

The prior art has suggested the use of a variety of adhesives in the formation of tubular fibrous regenerated cellulose casings. These prior art suggestions have never been successful commercially due to a variety of defects. U.S. Pat. No. 2,952,550 teaches the formation of fibrous casings from paper-reinforced regenerated cellulose sheet material using a variety of cellulose adhesives. Various cellulose esters are used for adhering sheet material into tubular form followed by treatment of the ester to saponify it and regenerate cellulose therefrom. Various acid and alkaline solvents, e.g., concentrated phosphoric acid and benzyl trimethyl ammonium hydroxide, are suggested for use in solubilizing cellulose so that tubes may be seamed and cellulose subsequently regenerated to form tubular casings. Another adhesive treatment involves the softening or solubilizing of cellulose with concentrated zinc chloride solutions to permit the sheet material to be formed into a tube. U.S. Pats. Nos. 2,686,128; 2,686,725; 2,773,773; 2,845,357; 2,953,072; 3,007,832; and 3,066,461 disclose a variety of adhesives for use in formation of fibrous casing from paper-reinforced regenerated cellulose sheet material. Most of the adhesives involve soluble cellulose derivatives which are subsequently insolubilized or involve certain resins which exhibit adhesive properties toward regenerated cellulose. The various adhesive compositions which are disclosed in the afore-mentioned patents are subject to a variety of defects or objections from a commercial standpoint. The adhesives are either expensive and difficult to apply or, in some cases, are toxic and undesirable for use in the preparation of sausage casings, or provide inadequate wet strength. There are many adhesives reported in the literature which provide adequate dry strength for joining cellulosic materials but are completely ineffective under rewet conditions. Accordingly, there has been a considerable need for a suitable adhesive composition for joining cellulosic sheet or film materials which will produce a seam or joint having high dry and wet strength.

STATEMENT OF OBJECTS AND FEATURES

It is an object of this invention to provide a new and improved adhesive composition for joining or adhering cellulosic sheet or film material.

A feature of this invention is a new and improved adhesive for cellulosic sheet and film materials which, when fully cured, produces a bond having high dry and wet strength.

Another feature of this invention is the provision of a new and improved adhesive composition for cellulosic sheet or film materials including a polymeric polyisocyanate and a curing agent therefor including a plasticizing ingredient and a surfactant ingredient.

Other objects and features of this invention will become apparent from time to time throughout the specification and claims as hereinafter related.

SUMMARY OF THE INVENTION

In accordance with this invention, it has been discovered that a fluid adhesive composition comprising a volatile organic solvent solution having a solute consisting of a film-forming mixture comprising a film-forming polymeric polyisocyanate, and a polyisocyanate cross-linking curing agent including at least one plasticizing ingredient, such as a poly glycol, and at least one surfactant ingredient, such as a fatty acid sorbitan partial ester is effective to adhere cellulosic sheet or film materials to produce adhesive bonds having high dry and wet strength. The adhesive may be used in seaming cellulosic sheet materials into tubular form to produce cellulosic casings having high dry and wet strength. The adhesive is preferably applied in a thin film, of the order of 0.1–0.2 mil, the product is formed into a tube and the adhesive, after being allowed to penetrate into the regenerated cellulose substrate, is cured by heating to an elevated temperature, e.g. 300°–320° F. for a period of 20–30 sec. more or less. The preferred adhesive compositions have a good pot life, e.g. 1 to 2 days or more.

DESCRIPTION OF THE PREFERRED EMBODIMENTS

Cellulosic sausage casings (or other tubular food packaging materials) may be prepared by forming cellulosic sheet or film material, either clear regenerated cellulose film or paper or other fiber-reinforced regenerated cellulose sheet material, into a tube and adhering the same by application of a novel adhesive composition to form a seam having high dry and wet strength. The adhesive composition is applied along the edge of the sheet or film material in a thin layer, e.g., of the order of 0.1–0.2 mil, a seam is then formed, and the adhesive, after having been allowed to remain on the sheet or film as a liquid for a time period, e.g., at least 30 sec. and preferably at least 2 min., to have effected the desired penetration of regenerated cellulose surfaces, is then cured by heating to a temperature of the order of 300°–320° F. for about 20–30 sec. The novel adhesive composition may also be used in the formation of adhesively bonded end closures in cellulosic casings.

The novel adhesive composition utilized in this invention comprises a solvent solution of a normally solid film-forming polymeric polyisocyanate and a curing agent therefor having (a) a plasticizing component, which imparts flexibility to films formed from the adhesive composition, and (b) a surfactant component to effect initial penetration of the fluid uncured adhesive into the cellulosic sheet or film. The adhesive composition contains sufficient curing agent to react with only part of said polyisocyanate with the resulting excess of isocyanate equivalents in the adhesive composition (i.e., as compared to the total equivalents of active-hydrogen functional groups of the curing agent) thereby being available to react with active-hydrogen-containing constituents within the surface to which the adhesive composition is to be applied. In general, the molar ratio of total isocyanate functionality to total available or potentially available active hydrogen functionality in the adhesive composition should be at least about 10/1. The adhesive composition, after penetration of the surface to be adhered, reacts with the usual water, glycerol, or other active-hydrogen-containing constituents thereof. The adhesive composition is effective to produce a seam joining cellulosic sheet of film materials which has a high dry and wet strength. In fact, the seam produced by this adhesive is strong enough that when it is subjected to a breaking force, after soaking in boiling water for about 10 min., the regenerated cellulose will be torn from the paper reinforcement or substrate rather than breaking along the adhesive bond.

Polymeric polyisocyanates used in the adhesive composition include normally solid film-forming polyether, polyester, and polyurethane polyisocyanates. Examples of such materials are Marlon polyisocyanates, e.g., Marlon 383, manufactured by Marlon Company; Mondur polyisocyanates, e.g., Mondur CB, manufactured by Mobay Chemical Company; and Polybond polyisocyanate adhesive manufactured by Polymer Industries, Inc. The preferred polyisocyanates have an —NCO group content of at least about 10 percent, solids weight basis.

Curing agents used in the adhesive composition are monomeric or polymeric materials having available or potentially available at least two active-hydrogen-containing substituents, i.e., are capable of cross-linking polyisocyanates, and include monomeric and polymeric glycols and polyols; e.g., ethylene glycol, propylene glycol, 1,3-butylene glycol, 1,4-butylene glycol, glycerol, trimethylol propane, polyethylene glycols, polypropylene glycols, polyglycerols, polypentaerythritols; lower alkylene oxide either adducts of the glycols and polyols, e.g., ethylene oxide, propylene oxide or butylene oxide adducts of the lower glycols and triols including ethylene glycol, propylene glycol, glycerol, and trimethylol propane (e.g., polyoxypropylene triols Actol 32-160, Actol 31—56, Actol 33—46),; fatty acid partial esters of polyols e.g., glycerol monostearate, sorbitan mono-, di-, and trilaurate, tristearate or trioleate; and epoxy compounds, e.g., epoxidized fatty oils (e.g. epoxidized soya bean oil), and other epoxy compounds such as vinylcyclohexene dioxide and 3,-4-epoxy-6-methylcyclohexylmethyl-3,4-epoxy-6-methyl-cyclohexane-carboxylate.

Although low molecular weight materials, e.g., ethylene, propylene, 1,3-butylene or 1,4-butylene glycols or triols, may be employed as components of the curing agent, higher molecular weight (e.g. molecular weight above about 200 and more preferably above about 500) cross-linking materials are greatly preferred. A long chain higher molecular weight cross-linking ingredient acts as an internal or self plasticizer, e.g., not only cross-links and provides surface bite but also provides flexibility in the resulting adhesive film. Thus, if a short chain lower molecular weight cross-linking agent is employed in the cross-linking agent, a plasticizing cross-linking ingredient, such as a higher molecular weight glycol, triol, or glycol ether, also should be incorporated.

The preferred plasticizing cross-linking ingredients are high molecular weight polyalkylene glycols or the polyethers formed by condensing ethylene, propylene or butylene oxides, or other alkylene epoxides with the lower molecular weight polyols and glycols (e.g., ethylene glycol, propylene glycol, glycerol, and trimethylol propane) whereby a long chain is provided having terminal hydroxyls. Examples of such materials include polyoxypropylene triols having a molecular weight above about 1,000 (e.g., Actol 32-160, Actol 31-56, or Actol 33-40) and polypropylene glycols of similar molecular weights, e.g., Union Carbide Polypropylene glycol 2,025 (molecular weight about 2,025).

Polyethers with at least three terminal hydroxyl groups are ideal plasticizing curing ingredients for film-forming or adhesive type polyisocyanate formulations. A compromise can be effected between long chain length (desirable for flexibility) and high proportion of available hydroxyl groups (desirable for reactivity with the isocyanate radical). The Actol triol series offers chains of polyoxypropylene attached to the nucleus of the original polyol (usually glycerol). The three terminal hydroxyl groups plus the long intervening oxypropylene chains react to give a 3-dimensional flexible polyurethane film.

In the adhesive composition, the curing agent also contains an ingredient which not only is a cross-linking agent for the polyisocyanate but has surfactant properties as well to ensure complete wetting of the regenerated cellulose film surface by the adhesive composition at all times. Preferred examples of such cross-linking surfactant ingredients are sorbitan partial fatty acid esters such as sorbitan mono-, di-, and tristearate, -laurate, -palmitate, and -oleate. The more preferred surfactant curing agent ingredient is sorbitan trioleate. The sorbitan partial esters are marked as "Spans" by Atlas Chemical Industries, Inc. (Chemicals Division), Wilmington, Del.

Other surfactant materials which can be used as the cross-linking surfactant wetting ingredient are epoxylated fatty oils (e.g., vegetable oils) such as Admex 710, a trademark of ADM Chemicals, Division of Ashland Oil and Refining Company, Minneapolis, Minnesota, for an epoxidized soybean oil, Paraplex G-62, a trademark of Rohm and Haas Company, Philadelphia, Pennsylvania, for an epoxidized soybean oil, Epoxol 9-5, a trademark of Swift and Company, Chicago, Illinois, for an epoxidized oil (a polyepoxide monomer) with a minimum of 9 percent oxirane oxygen and an average of over 5 reactive groups per molecule, and Epoxol 7-4, an epoxidized soybean oil with a minimum of 7 percent oxirane oxygen and an average of over 4 reactive groups per molecule. Some ingredients, e.g., the epoxidized fatty oils, function both as surfactants and plasticizers.

In preparing the adhesive compositions, the polymeric polyisocyanate is usually initially dissolved with from about 60 to about 80 parts solvent per 100 parts polyisocyanate resin, and the resultant solution is mixed with the curing agent ingredients in solution in a small amount, e.g., 10–30 parts per 100 parts polyisocyanate resin, of the same or another solvent, methylethyl ketone, acetone, and the like. When the composition is thus prepared, it is quite viscous and preferably is applied as is, although it may, if desired, be further diluted, e.g., to total solvent levels ranging up to and over 500 parts using a suitable volatile solvent. It is preferred to use an inert, low-boiling solvent (i.e., active-hydrogen free liquid having a normal boiling point below about 175° C.) which aids in imparting to the composition a useful pot life of at least 24 hours and preferably over 48 hours and which, when the adhesive is utilized, penetrates or bites into the cellulose film or sheet. Examples of such solvents include ethers, esters or ketones free of hydroxy groups such as Cellosolve acetate (i.e., ethylene glycol monoethyl ether acetate), methylethyl ketone, acetone, tetrahydrofuran, ethyl acetate, etc. Relatively non-penetrating solvents such as suitably volatile liquid hydrocarbons, e.g., xylene, also may be and often are included as a portion, e.g., up to about 50 percent by volume, of the total solvent ingredient by virtue of the polyisocyanate being supplied commercially in such solvents. Solvents such as monomethyl Cellosolve and amyl alcohol which contain active hydrogen, but which are substantially non-reactive with the polyisocyanate ingredient at room temperature (e.g. at 25° C.), also may be employed in instances where the adhesive composition is to be employed shortly after use. A general criteria of such latter solvents is that they should not reduce the useful pot life of the adhesive compositions below about 6 hours, and undesirably alter the NCO/OH ratio.

The preparation of preferred embodiments of the adhesive compositions and the application of those compositions in sealing or seaming cellulosic film or sheet materials is illustrated in the following non-limiting examples. In these examples, parts or percentages are by weight unless otherwise stated.

EXAMPLE 1

An adhesive composition was prepared comprising a polymeric polyisocyanate, a polyol activator, and a wetting agent. Mondur CB, a polymeric polyisocyanate having a 17.3% NCO content with a solid equivalent weight of 243 and available commercially from Mobay Chemical Company, was used in a solution comprising 100 parts polyisocyanate resin in 41 parts inert Cellosolve (e.g. ethylene glycol monoethyl ether acetate) and 25 parts xylene. To this solution there was added a solution of 8 parts Actol 32-160 polyoxyproplylene triol and 2 parts Span 85 (sorbitan trioleate) in 12 parts tetrahydrofuran. The composition was mixed thoroughly and applied as an adhesive in seaming cellulosic sheet and film materials.

The adhesive composition prepared above was applied to the edge of a paper-reinforced regenerated cellulose sheet in a thickness of about 0.1–0.2 mil and allowed to penetrate the surface for 2–4 min. The sheet was formed into a tube and the adhesive cured by heating at 300°–320° F. for about 20–30 sec. The tubular casing which was thus prepared was soaked in 85° C. water for 30 min. and evaluated for tensile strength. When the casing was broken along the seam, it was found that the regenerated cellulose coating on the paper delaminated from the paper substrate before the seam would break.

The adhesive composition was also used in forming end seals on cellulosic casings. A tubular fibrous (hemp fiber paper-reinforced) casing was folded at one end to provide a closure of the type used in forming the bottom of a paper bag. The adhesive composition formulated above was used in sealing the bag closure. The casing with an adhesively sealed bag end closure is used in processing bolognas and other similar large sausages. When the casing is fully stuffed with sausage emulsion, the end closure does not break and a sausage product is obtained having a flat end. The adhesively sealed end closure has adequate strength to resist breakage during processing and cooking and does not break even when the sausage is held in a vertical position with the entire weight of the sausage emulsion bearing against the end closure.

EXAMPLE 2

Mondur CB was used in a solution comprising 100 parts polyisocyanate resin in 41 parts inert Cellosolve and 25 parts xylene. To this solution, there was added a solution of 8 parts Admex 710 (epoxidized soya bean oil) and 2 parts Span 85 (sorbitan trioleate) in 20 parts tetrahydrofuran. The composition was mixed thoroughly and applied as an adhesive in seaming cellulosic sheet and film materials.

The adhesive composition prepared above was used in seaming cellulose tubes and casings and in forming bag-type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water, the break usually occurred by delamination of the regenerated cellulose from the paper substrate rather than along the adhesive bond.

EXAMPLE 3

An adhesive composition was prepared comprising a polyisocyanate, polyol activator, and a wetting agent. Mondur CB was used in solution comprising 100 parts of polyisocyanate resin in 41 parts inert Cellosolve and 25 parts xylene. To this solution, there was added a solution of 8 parts Actol 31–56 and 2 parts Span 85 in 20 parts tetrahydrofuran. The composition was mixed thoroughly and applied as an adhesive in seaming cellulosic sheet and film materials and in forming bag-type end closures on cellulosic casings.

The adhesive composition prepared above was used in seaming cellulose tubes and casings and in forming bag-type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water, the break usually occurred by delamination of the regenerated cellulose from the paper substrate rather than along the adhesive bond.

EXAMPLE 4

An adhesive composition was prepared comprising a polymeric polyisocyanate, polyglycol activator, and a wetting agent. Mondur CB was used in solution comprising 100 parts polyisocyanate resin in 41 parts inert Cellosolve and 25 parts xylene. To this solution, there was added a solution of 8 parts PPG2025 (polypropylene glycol) and 2 parts Span 85 in 20 parts tetrahydrofuran. The composition was mixed thoroughly and applied as an adhesive in seaming cellulosic sheet and film materials and in forming bag-type end closures on cellulosic casings.

The adhesive composition prepared above was used in seaming cellulose tubes and casings and in forming bag-type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water, the break usually occurred by delamination of the regenerated cellulose from the paper substrate rather than along the adhesive bond.

EXAMPLE 5

An adhesive composition was prepared comprising a polymeric polyisocyanate and a slightly larger proportion of the polyol activator. Mondur CB was used in a solution comprising 100 parts polyisocyanate resin in 41 parts inert Cellosolve and 25 parts xylene. To this solution there was added a solution of 100 parts Actol 32–160 and 2 parts Span 85. The composition was mixed thoroughly and applied as an adhesive in seaming cellulosic sheet and film materials and in forming bag-type end closures.

The adhesive composition prepared above was used in seaming cellulose tubes and casings and in forming bag-type end closures on cellulosic casings as described in Example 1. The adhesive seal had a high wet and dry strength as described above. The seam does not tend to break during stuffing of the casing. Likewise, end seals do not tend to break open even when the sausage is held in a vertical position with the entire weight of the sausage emulsion bearing against the end closure. When portions of the casing were broken after soaking in hot water, the break usually occurred by delamination of the regenerated cellulose from the paper substrate rather than along the adhesive bond.

EXAMPLE 6

In another experiment, the procedure of Example 1 was repeated substituting Marlon 383 polymeric polyisocyanate (Marlon Company, Broadview, Illinois), for the Mondur CB. Marlon 383 was used in solution at a 76 percent solids content and contains 14.9% NCO calculated on the solid resin and has a solid equivalent weight of 282. The composition was otherwise the same as that used in Example 1 and produced an adhesive bond substantially the same as that obtained in Example 1.

The adhesive compositions described above are useful in treating a considerable variety of cellulosic materials. These adhesives may be used in sealing or adhering regenerated cellulose films, paper or fiber-reinforced regenerated cellulose films or sheets, and other cellulosic materials such as paper and textiles. The adhesive compositions are particularly useful in seaming regenerated cellulose or paper or fiber-reinforced regenerated cellulose films or sheets into tubular casings. The adhesives are useful in forming bag-type end seals on cellulosic casings. The adhesives are primarily useful in conjunction with the sealing of cellulosic materials but are also useful in sealing sheets or films of cured and insolubilized polyvinyl alcohol or polyvinyl alcohol copolymers or paper or fibrous reinforced sheets or films of polyvinyl alcohol or polyvinyl alcohol copolymers. In the formation of bag-type end closures on cellulosic casings, the adhesive is useful both with untreated or uncoated casings and casings which have a release coating on their inner surface. The surfactants and solvents used in the preparation of the adhesive compositions and other solvents which may be used in further diluting the adhesive compositions enable the adhesive to penetrate release coatings and adhere to the regenerated cellulose or the paper-reinforced regenerated cellulose substrate.

In the several examples set forth above, there are illustrated preferred adhesive compositions. The proportions of the polyisocyanate and activator and wetting agent are not highly critical but are selected to provide the desired function. The concentration of the polymeric polyisocyanate in the compositions may, for example, range from about 10 to about 80 percent weight of the total formulation but preferably is in the range of from about 40 to about 75 percent. The curing agent is added in an amount sufficient to cross-link the polyisocyanate and cause it to cure across the entire thickness of the adhesive bond. The curing agent may be used in total amounts ranging up to and over 100 percent but more usually in the range of from about 1 percent to about 20 percent, based on the weight of polyisocyanate resin. Of the total curing agent, the proportion of each of surfactant ingredient and plasticizer ingredient in the composition is generally at least about 0.5 percent, and more usually in the range of from about 1 to about 20 percent, based on the weight of polyisocyanate resin.

Other embodiments which do not depart from the spirit and scope of the present invention, of course, will be apparent to those skilled in the art. Accordingly, it will be understood the present invention is to be limited only by the scope of the appended claims.

What is claimed is:

1. A fluid, film-forming adhesive composition for adhering sheet or films of cellulose, regenerated cellulose or polyvinyl alcohol, said adhesive composition consisting essentially of a solution of a solute mixture of a film-forming polymeric polyisocyanate resin having an —NCO group content of at least about 10 percent, solids weight basis, and from about 1 percent to about 100 percent based on the weight of said polyisocyanate of a curing agent consisting essentially of a monomeric or polymeric glycol or polyol, a lower alkylene oxide ether adduct of a monomeric or polymeric glycol or polyol, a partial fatty acid ester of a polyol, or an epoxidized oil, capable of cross-linking said polyisocyanate in a solvent consisting essentially of an ether, ester, or ketone free of hydroxy groups, or mixtures thereof with a volatile hydrocarbon, said solvent being substantially non-reactive with said polyisocyanate at about 25° C., a plasticizer ingredient consisting essentially of a high molecular weight poly alkylene glycol or a high molecular weight poly ether having terminal hydroxy groups, which imparts improved flexibility to film formed from said adhesive composition and a surfactant ingredient consisting essentially of a fatty acid partial ester of a polyol, or an epoxidized fatty oil, which promotes wetting out of said fluid solution on cellulose, regenerated cellulose, or polyvinyl alcohol sheets or films, said adhesive composition containing an excess of isocyanate equivalents over the equivalents of active-hydrogen-containing groups, said adhesive composition being characterized by an ability to penetrate the surface of said sheets or films and to react through isocyanate groups of said polyisocyanate with active-hydrogen-containing constituents within said sheets or films upon removal of said solvent.

2. An adhesive composition as defined in claim 1 in which said plasticizer component includes a glycol, polyol, or lower alkylene oxide ether adduct thereof having a molecular weight of at least about 200.

3. An adhesive composition as defined in claim 2 in which said plasticizer component includes a polyoxypropylene triol or a polypropylene glycol.

4. An adhesive composition as defined in claim 1 in which said plasticizer component includes an epoxidized soya bean oil.

5. An adhesive composition as defined in claim 1 in which said surfactant component includes sorbitan trioleate.

* * * * *